United States Patent [19]
Oda et al.

[11] 4,390,511
[45] Jun. 28, 1983

[54] PROCESS FOR PRODUCING SF$_6$ THROUGH SF$_5$CL

[75] Inventors: Yoshio Oda; Shinsuke Morikawa; Masaaki Ikemura; Tomio Yarita; Makoto Noshiro; Isao Gotoh, all of Yokohama; Yukio Jitsugiri, Yokosuka; Shigeaki Yonemori; Kimihiko Sato, both of Yokohama; Keiichi Uchida, Kawasaki, all of Japan

[73] Assignee: Asahi Glass Company Ltd., Tokyo, Japan

[21] Appl. No.: 286,887

[22] Filed: Jul. 27, 1981

[30] Foreign Application Priority Data

Aug. 12, 1980 [JP] Japan .................. 55-109809
Aug. 12, 1980 [JP] Japan .................. 55-109810
Sep. 26, 1980 [JP] Japan .................. 55-132829

[51] Int. Cl.$^3$ .................. C01B 7/24; C01B 17/45; C01B 17/46
[52] U.S. Cl. .................. 423/469; 423/466; 423/467
[58] Field of Search .................. 423/467, 469, 561 R, 423/466

[56] References Cited

U.S. PATENT DOCUMENTS 2,897,055 7/1959 Muetterties et al. .................. 423/469
4,082,839 4/1978 Beck et al. .................. 423/469

FOREIGN PATENT DOCUMENTS 235840 10/1961 Australia .................. 423/469
21331 1/1981 European Pat. Off. .................. 423/467
56-26704 3/1981 Japan .................. 423/469

Primary Examiner—Gary P. Straub
Attorney, Agent, or Firm—Oblon, Fisher, Spivak, McClelland & Maier

[57] ABSTRACT

SF$_6$ is produced by a pyrolysis of SF$_5$Cl obtained by a reaction of sulfur or sulfur chloride with chlorine and an amine/hydrogen fluoride complex or a reaction of sulfur tetrafluoride with chlorine and an amine/hydrogen fluoride complex.

7 Claims, 2 Drawing Figures

PROCESS FOR PRODUCING SF$_6$ THROUGH SF$_5$CL

BACKGROUND OF THE INVENTION

1. Field of the Invention

The present invention relates to a process for producing sulfur hexafluoride (SF$_6$). More particularly, it relates to a process for easily producing SF$_6$ having high purity in a mass production at a low cost.

2. Description of the Prior Art

SF$_6$ has been used as an insulating material for electric power sources having high voltage and large capacity; electric devices, breakers, a lightening arrester and cables in computer circuits in view of non-toxicity and high insulating property.

Various proposals of a production of SF$_6$ such as a direct combustion synthesis, an electrolysis etc. have been found. Thus, the direct combustion process has been employed as an industrial process in view of a cost etc.

In the direct combustion process, it is necessary to react sulfur with fluorine gas. The fluorine gas has been usually obtained by an electrolysis of a molten salt of KF.nHF etc. Thus, the cost of electric power is remarkably high. Moreover, in a mass production, it is necessary to operate many electrolytic cells in proportion to the production or to use an electrolytic cell having a large capacity. The scale-up of the process is disadvantageous in view of an equipment area and a cost.

On the other hand, another process which does not require the expensive fluorine gas produced by the electrolysis has been also proposed. For example, SF$_5$Cl is produced by reacting NOF.3HF with chlorine gas to produce SF$_4$ and removing by-products and reacting the purified SF$_4$ with NOF and chlorine. However, NOF used in the process is remarkably corrosive to impart high corrosive effect in the presence of only small amount of moisture. Thus, an reactor made of expensive anticorrosive substance is needed. The process has not been satisfactory as an industrial process.

SUMMARY OF THE INVENTION

It is an object of the present invention to produce SF$_6$ having high purity in a mass production at low cost by an industrially advantageous process without using fluorine gas which is obliged to obtain by an electrolysis.

The foregoing and other objects of the present invention have been attained by providing a process for producing SF$_6$ by a pyrolysis of SF$_5$Cl obtained by a reaction of sulfur or sulfur chloride with chlorine and an amine/hydrogen fluoride complex or a reaction of sulfur tetrafluoride with chlorine and an amine/hydrogen fluoride complex.

DETAILED DESCRIPTION OF THE PREFERRED EMBODIMENTS

Figure 1:
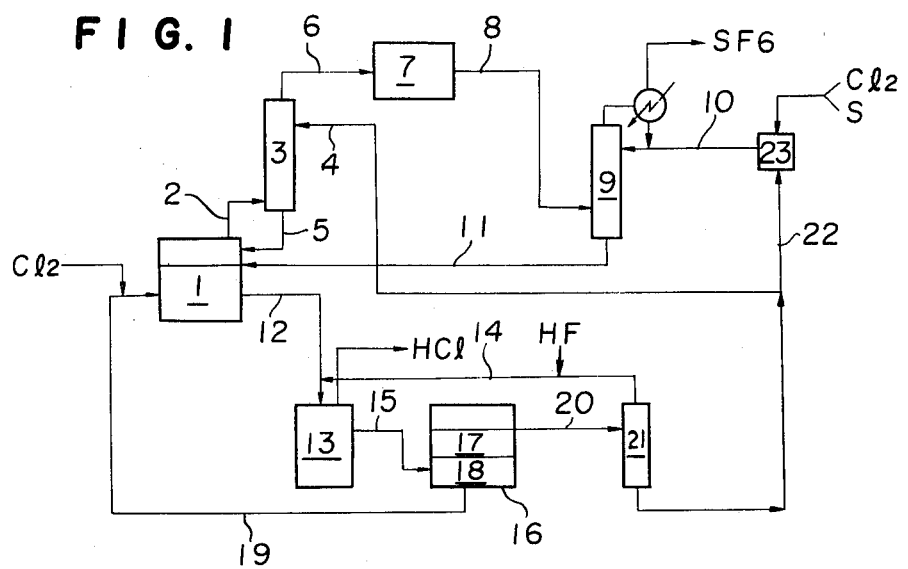
FIG. 1 is a diagram of one embodiment of the process of the present invention.

The amine/hydrogen fluoride complex used in the present invention have a formula:

$$A.(HF)_n$$

wherein A represents an amine and n is 1 to 6. It is especially preferable to use A.(HF)$_n$ (n is 2 to 4) since a reaction velocity is high enough as an industrial process.

Suitable ratios of sulfur, chlorine and A.(HF)$_n$ used in the reaction are preferably 1 to 15 mols of A.(HF)$_n$ and 2 to 10 mols of chlorine per mol of sulfur. When the ratios are out of the ranges, a utility efficiency of A.(HF)$_n$ or chlorine or a yield of SF$_5$Cl is disadvantageously low. It is especially preferable to use 3 to 4 mols of chlorine per mol of sulfur and 7 to 12 mols of A.(HF)$_n$ (n=3) (the optimum ratio of A.(HF)$_n$ to sulfur is depending upon n) since SF$_5$Cl is obtained at high yield and a utility efficiency of the starting materials is high.

The process for producing SF$_5$Cl used in the process of the present invention will be illustrated.

The amine/hydrogen fluoride complex used in the process of the present invention have the formula $$A.(HF)_n$$

wherein n is usually in a range of 1 to 6. It is preferable to use A:(HF)$_n$ (n is 2 to 4) since a reaction velocity is high enough as an industrial process. It is possible to combine two or more kinds of the amine components at a desired ratio. The process for producing the amine/hydrogen fluoride complex A.(HF)$_n$ used in the present invention is not critical and can be any known processes. For example, it can be produced by charging the amine in a tank made of polyethylene etc. which has hydrofluoric acid resistance, and feeding hydrogen fluoride while externally cooling.

The process for producing SF$_5$Cl by reacting the resulting amine/hydrogen fluoride complex with sulfur chloride and chlorine will be illustrated.

SF$_5$Cl is produced by reacting the resulting amine/hydrogen fluoride complex with sulfur chloride and excess of chlorine. In the reaction, the amine/hydrogen fluoride complex is charged in a reactor and then, sulfur chloride and excess of chlorine are respectively fed at each suitable rate.

The process for producing sulfur chloride used for the reaction is not critical. Sulfur monochloride or sulfur dichloride obtained by a reaction of sulfur monochloride with chlorine or a reaction of chlorine with sulfur suspended in an inert medium in the presence of a catalyst such as iodine. Sulfur monochloride itself can be used.

An amount of an amine/hydrogen fluoride A.(HF)$_n$ used in the process of the present invention is depending upon n of A.(HF)$_n$ as the amine hydrogen fluoride. It is preferable to give a molar ratio of A/S (S: sulfur) of about 1 to 15 especially about 4 to 8. When the amount of the amine/hydrogen fluoride complex A.(HF)$_n$ is less than the range, the conversion of sulfur chloride is too low whereas when it is more than the range, a further improvement of the conversion can not be expected to waste A.(HF)$_n$. The amount of the amine treated in the post treatment is disadvantageously increased.

Excess chlorine is used. It is preferable to use 2 to 10 mols of chlorine per mol of sulfur of sulfur chloride. When the amount of chlorine is less than the range, a yield of SF$_5$Cl is not satisfactory in an industrial process whereas when it is more than the range, a large amount of the unreacted chlorine is disadvantageously incorporated in the reaction mixture.

The reaction is preferably carried out at a temperature of 0° to 60° C. under a pressure of 1 to 10 kg/cm$^2$.Gauge. When the temperature is higher than 60° C., sulfur chloride or the amine is partially decomposed or certain side-reaction beside the object reaction may be performed. The reaction can be performed in the absence of a solvent; however, the reaction is smoothly performed in a solvent. The solvent used in the reaction must be inert to the starting materials or the product and is preferably a halogenated hydrocarbon, especially methylenechloride, chloroform, carbon tetrachloride fluorotrichloromethane or trichlorotrifluoroethane. One or more solvents can be used.

An amount of the solvent is preferably in a range of 10 to 200 wt.% based on the total starting materials.

The process for producing $SF_5Cl$ by reacting $SF_4$ with chlorine and $A.(HF)_n$ will be illustrated.

The same amine/hydrogen fluoride complex $A.(HF)_n$ can be used.

Suitable ratios of $SF_4$, chlorine and $A.(HF)_n$ are depending upon n of $A.(HF)_n$. In the case of n=3, it is preferable to use 0.1 to 10 mols of $A.(HF)_n$ and 0.1 to 5 mols of chlorine per mol of $SF_4$. When the ratios are out of the ranges, the yield of $SF_5Cl$ is remarkably low or the utility efficiency of $A.(HF)_n$ or chlorine is disadvantageously low.

In the case of n=3, it is preferable to use 1 to 3 mols of $A.(HF)_n$ and 1 to 2 mols of chlorine per mol of $SF_4$ since $SF_5Cl$ is produced at a high yield at a desired reaction velocity which is industrially satisfactory.

$SF_4$ as the starting material can be produced by reacting a fluorinating agent such as HF, NaF, KF, LiF, RbF, CaF, AgF, HgF, $AlF_2$, $PbF_4$, $SbF_5$, $BiF_5$, $MnF_3$ and $A.(HF)_n$ (A and n are defined above) with sulfur or a sulfur compound such as $S_2Cl_2$, $SCl_2$, $SCl_4$ and $S_2Br_2$ at a reaction temperature of 40° to 150° C. As the condition for producing $SF_5Cl$ from the starting materials, the reaction temperature is in a range of 10° to 60° C. and the pressure is about the atmospheric pressure, if desired, about 5 atm. The reaction can be performed in the absence of a solvent; however, the reaction is smoothly performed in a solvent with an easy operation. The solvent is preferably inert to the starting materials and the product and preferably a halogenated hydrocarbon, especially fluorotrichloromethane, trichlorotrifluoroethane, methylenechloride, chloroform and carbon tetrachloride. One or more kinds of the solvent can be used. It is optimum to use trichlorotrifluoroethane since an amine/hydrogen chloride complex as a by-product in the production of $SF_5Cl$ can be separated into the different layer in the solvent and the by-product can be advantageously recovered and reused.

An amount of the solvent is preferably in a range of 10 to 200 vol.% based on the total starting materials.

A completely mixing type reactor equipped with a desired stirrer is preferably used as a reactor used for a production of $SF_5Cl$. It is preferable to use a reactor made of an anticorrosive substance especially having chlorine resistance such as stainless steel SUS and fluorine-contained resin of an inner wall.

The resulting $SF_5Cl$ is converted into $SF_6$ by a pyrolysis. In the pyrolysis, $SF_5Cl$ can be converted into $SF_6$ at a reaction temperature of at least 400° C. When the pyrolysis is carried out in the presence of a catalyst of copper or mercury, the reaction temperature can be relatively low such as 200° to 300° C. and the conversion velocity can be high.

In the industrial operation of the process of the present invention, various flows can be combined since the amine is expensive and is not consumed by the reaction and by-products are preferably removed, recovered or reused.

Figure 2:
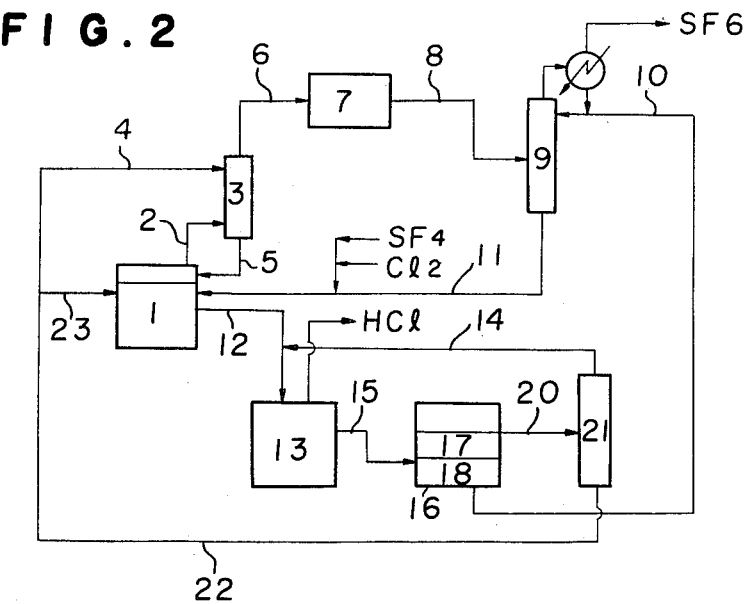
FIG. 2 is a diagram of the other embodiment of the present invention.

It is especially to combine the flows as shown in FIGS. 1 and 2 in the process of the present invention.

FIG. 1 shows a flow diagram of a reaction of sulfur or sulfur chloride with chlorine and the amine/hydrogen fluoride complex.

FIG. 2 shows a flow diagram of a reaction of $SF_4$ with chlorine and the amine/hydrogen fluoride complex.

The embodiment of FIG. 1 will be illustrated.

Into a reactor (1), sulfur or sulfur chloride, the amine/hydrogen fluoride complex and a solvent of trichlorotrifluoroethane are fed to react them whereby $SF_5Cl$ is produced with a small amount of $SF_4$ as a by-product. The gaseous products are passed through a line (2) to a separator (3) in which the amine/hydrogen fluoride complex is fed through a line (4). $SF_4$ is trapped by the amine/hydrogen fluoride complex and returned from the separator (3) through a line (5) to the reactor (1). $SF_5Cl$ is discharged from the upper outlet of the separator (3) through a line (6) to feed it into a pyrolyzer (7) to convert it into $SF_6$. In the pyrolysis, $SF_4$ and chlorine are also produced as by-products together with $SF_6$. The mixed gas is fed through a line (8) to a separator (9) in which chlorine, sulfur or sulfur chloride and the amine/hydrogen fluoride complex are fed through a line (10). $SF_4$ and chlorine as the by-products in the pyrolysis of $SF_5Cl$ are trapped by the feed mixture and are returned through a line (11) to the reactor (1). Thus, $SF_6$ as the product is discharged from the separator (9).

On the other hand, in the reactor (1), an amine/hydrogen chloride complex as a by-product and sulfur chloride and the solvent in the liquid form are fed through a line (12) into a reproducing device (13) in which HF is fed through a line (14) at a rate enough to remove hydrogen chloride of the amine/hydrogen chloride complex. The molar ratio of HF to the amine/hydrogen chloride complex is at least 6 preferably in a range of about 7 to 8 so as to form substantially immiscible phases in the separation of sulfur chloride from the recovered amine/hydrogen fluoride complex.

The mixture of the resulting amine/hydrogen fluoride complex, the solvent and sulfur chloride is fed through a line (15) into a liquid phase separator (18). In the separator (16), the mixture is kept in stand-still whereby the amine/hydrogen fluoride complex is separated as the upper phase and the solvent and sulfur chloride are separated as the lower phase. The solvent and sulfur chloride as the lower phase are returned through a line (19) into the reactor (1). On the other hand, the amine/hydrogen chloride complex as the upper phase is $A.(HF)_{6-8}$. In such state, hydrogen chloride is substantially separated. The reaction is usually performed at a temperature of 0° to 50° C. under the atmospheric pressure. The product is $A.(HF)_{6-8}$ which is inert. Thus, the product is fed through a line (20) into a distilling apparatus (21) and is distilled at 100° to 300° C. under a pressure of 760 to 100 mmHg to recover $A.(HF)_{2.5-3.5}$. The reproduced amine/hydrogen fluoride complex allotted to a line (4) and a line (10). Excess HF separated by the distillation is fed through a line (14) to mix with newly added HF.

The other embodiment of FIG. 2 will be illustrated.

Into a reactor (1), $SF_4$, chlorine, the amine/hydrogen fluoride complex and trichlorotrifluoroethane as a solvent are fed to react them. $SF_5Cl$ and a small amount of by-products are produced by the reaction and a mixed gas of the products and the unreacted materials is discharged through a line (2). The mixed gas is fed into a separator (3) into which the amine/hydrogen fluoride complex is fed through a line (4). $SF_4$ is trapped by the amine/hydrogen fluoride complex and is returned from the separator (3) through a line (5) to the reactor (1). $SF_5Cl$ is discharged from the upper outlet of the separator (3) through a line (6) and fed into a pyrolyzer (7) in which $SF_5Cl$ is converted into $SF_6$. $SF_4$ and chlorine are produced as by-products together with $SF_6$ by the pyrolysis. The mixed gas is fed through a line (8) to a separator (9). The lower phase component (solvent) in a liquid phase separator (16) is fed through a line (10) into the separator (9), $SF_4$, $Cl_2$ etc. as the by-products formed by the pyrolysis of $SF_5Cl$ are trapped and are returned through a line (11) to the reactor (1). $SF_6$ as the product is discharged from the separator (9). On the other hand, in the reactor (1), a mixture of the solvent and the amine/hydrogen chloride complex as the by-product in the liquid form is fed through a line (12) into a reproducing device (13) in which HF is fed through a line (14) at a rate enough to remove hydrogen chloride of the amine/hydrogen chloride complex. A molar ratio of HF to the amine/hydrogen chloride complex is at least 6 preferably in a range of 7 to 8 so as to form substantially immiscible phases in the separation of sulfur chloride from the recovered amine/hydrogen fluoride complex.

The mixture of the resulting amine/hydrogen fluoride complex, the solvent and sulfur chloride is fed through a line (15) into a liquid phase separator (16). In the separator (16), the mixture is kept in stand-still whereby the amine/hydrogen fluoride complex is separated as the upper phase and the solvent and sulfur chloride are separated as the lower phase. The solvent as the lower phase is fed through a line (10) into the separator (9). On the other hand, the amine/hydrogen chloride complex as the upper phase is $A.(HF)_{6-8}$. In such state, hydrogen chloride is substantially separated. The reaction is usually performed at a temperature of 0° to 50° C. under the atmospheric pressure. The product is $A.(HF)_{6-8}$ which is inert. Thus, the product is fed through a line (20) into distilling apparatus (21) and is distilled at 100° to 300° C. under a pressure of 760 to 100 mmHg to recover $A.(HF)_{2.5-3.5}$. The reproduced amine/hydrogen fluoride complex is allotted to a line (4) and a line (23). Excess HF separated by the distillation is fed through a line (14) to mix with newly added HF.

EXAMPLE 1

The system of FIG. 1 was used.

Into the reactor made of stainless steel SUS 310S equipped with a stirrer, chlorine was fed at a rate of 2.5 mols/hour and $Py.(HF)_3$ (P: pyridine) and sulfur chloride ($S_2Cl_2$) were fed from the tank (23) through the line (11) and $Py.(HF)_3$ was fed through the lines (4), (5) to react them in trichlorotrifluoroethane (R-113) as a solvent fed through the line (19) at a rate of 2 mols/hour. The reaction was carried out at molar ratios of $S:Cl_2:Py.(HF)_3$ of 1:3:9 at 35° C. for a residence time of 1.0 hour. The gaseous reaction mixture was discharged through the line (2) and fed into the separator in which fluorine-contained resin tubes having a diameter of 6 mm and a length of 6 mm. $Py.(HF)_3$ was fed through the line (4) into the separator at a rate of 2.5 mols/hour to counter-currently contact them at 30° C.

The gas was sampled from the upper outlet of the separator (3) and analyzed by NMR to find $SF_5Cl$, $SF_4$ and a small amount of $SOF_2$ at molar ratios of 90:9.5:0.5. The gas was discharged through the line (6) and fed into the pyrolyzer (7) as a reactor in which Cu catalyst was packed. The pyrolysis was carried out at 300°–350° C. to form $SF_6$. The gas formed in the pyrolyzer (7) is fed through the line (8) into the separator (9) to counter-currently contact with sulfur monochloride fed at a rate of 0.5 mol/hour and $Py.(HF)_3$ fed at a rate of 6.5 mols/hour through the line (10) at a low temperature of −30° C. The gas was sampled from the separator (9) and liquefied with liquid nitrogen and analyzed by NMR. $SF_6$ having high purity of at least 99% which contained small amounts of $SOF_2$, $SF_5Cl$, $SF_4$ and R-113 was obtained.

$SF_4$ and $Cl_2$ produced by the pyrolysis of $SF_5Cl$ were discharged from the bottom of the separator (9) and fed through the line (11) to the reactor (1) so as to use them as the starting materials for $SF_5Cl$.

On the other hand, in the reactor (1) a mixture of the pyridine/hydrogen chloride complex and sulfur chloride as the by-products and the solvent in the liquid form was discharged through the line (12) and fed into the reproducing device (13) made of SUS 310S equipped with a stirrer. Into the reproducing device, hydrofluoric acid (HF) was continuously fed through the line at a rate of 51 mols/hour to react them at 35° C. for a residence time of 2 hours. Hydrogen chloride separated from pyridine (Py) by the reaction was discharged through the line (24).

The mixture of the resulting $Py.(HF)_n$, the solvent and, sulfur chloride was fed through the line (15) into the liquid phase separator (17) in which the mixtures was separated by specific gravity difference into the R-113 solvent phase containing sulfur chloride and the $Py.(HF)_n$ phase and the lower phase containing R-113 solvent and sulfur chloride was fed through the line (19) into the reactor (1). The upper phase of $Py.(HF)_n$ was fed through the line (20) into the distillation tower (21) made of an anticorrosive alloy, in which excess HF was separated by batch operations to produce $Py.(HF)_3$. $Py.(HF)_3$ was sampled through the line (20) and sulfur chloride dissolved was analyzed by a fluorescent X-ray process. It was 400 ppm as S.

Into the distillation tower (21), 2400 g. of pyridine/hydrogen fluoride complex having an average formula of $Py.(HF)_8$ was fed and fractionally distilled at 150° C. under a pressure of 300 mmHg for 3 hours. As a result, 1000 g. of hydrogen fluoride was discharged from the top of the distillation tower and 1400 g of the pyridine/hydrogen fluoride complex having an average formula of $Py.(HF)_3$ was recovered from the bottom. According to a fluorescent X-ray analysis, the product contained heavy metal components of 300 ppm of Fe, 30 ppm of Ni and 15 ppm of Cr. Thus, $Py.(HF)_3$ was fed through the line (4) at a rate of 2.5 mols/hour and through the line (22) at a rate of 6.5 mols/hour so as to use it as the starting material for the next reaction.

The unreacted sulfur chloride, the R-113 solvent and the reproduced $Py.(HF)_3$ were recycled into the reactor to perform the reaction. As a result, the yield and purity of $SF_6$ as the object product were substantially the same.

EXAMPLE 2

The system of FIG. 2 was used.

Into the reactor made of SUS 310S equipped with a stirrer, $SF_4$ gas and chlorine gas were respectively fed at rates of 1.5 mols/hour and 2.3 mols/hour and $Py.(HF)_3$ was fed through the lines (4), (23) to react them in trichlorotrifluoroethylene (R-113) as a solvent fed through the line (11) at a rate of 2 mols/hour. The reaction was carried out at molar ratios of $SF_4:Cl_2:Py.(HF)_3$ of 1:1.1:6 at 35° C. for a residence time of 1.0 hour. The gaseous reaction mixture was discharged through the line (2) and fed into the separator in which fluorine-contained resin tubes having a diameter of 6 mm and a length of 6 mm. $Py.(HF)_3$ was fed through the line (4) into the separator at a rate of 2.5 mols/hour to counter-currently contact them at 30° C. The gas was sampled from the upper outlet of the separator (3) and analyzed by NMR to find $SF_5Cl$, $SF_4$ and a small amount of $SOF_2$ at molar ratios of 93:6.5:0.5. The gas was discharged through the line (6) and fed into the pyrolyzer (7) as a reactor in which Cu catalyst was packed. The pyrolysis was carried out at 300°–350° C. to form $SF_6$. The gas formed in the pyrolyzer (7) is fed through the line (8) into the separator (9) to counter-currently contact with sulfur monochloride fed through the line (10) at a low temperature of $-30°$ C. The gas was sampled from the separator (9) and liquefied with liquid nitrogen and analyzed by NMR. $SF_6$ having high purity of at least 99% which contained small amounts of $SOF_2$, $SF_5Cl$, $SF_4$ and R-113 was obtained.

$SF_4$ and $Cl_2$ produced by the pyrolysis of $SF_5Cl$ were discharged from the bottom of the separator (9) and fed through the line (11) to the reactor (1) so as to use them as the starting materials for $SF_5Cl$.

On the other hand, in the reactor (1), a mixture of the pyridine/hydrogen chloride complex and sulfur chloride as the by-products and the solvent in the liquid form was discharged through the line (12) and fed into the reproducing device (13) made of SUS 310S equipped with a stirrer. Into the reproducing device, hydrofluoric acid (HF) was continuously fed through the line at a rate of 6.3 mols/hour to react them at 35° C. for a residence time of 2 hours. Hydrogen chloride separated from pyridine (Py) by the reaction was discharged through the line (24).

The mixture of the resulting pyridine/hydrogen fluoride complex, the solvent and sulfur chloride was fed through the line (15) into the liquid phase separator (17) in which the mixture was separated by specific gravity difference into the R-113 solvent phase and the pyridine/hydrogen fluoride complex phase. The lower R-113 phase was fed through the line (10) into the separator (9) and the upper phase of pyridine/hydrogen fluoride complex was fed through the line (20) into the distillation tower (21) made of an anticorrosive alloy, in which excess HF was separated by a distillation to produce $Py.(HF)_3$.

Into the distillation tower (21), 2400 g. of pyridine/hydrogen fluoride complex having an average formula $Py.(HF)_8$ was fed and fractionally distilled at 150° C. under a pressure of 300 mmHg for 3 hours. As a result, 1000 g. of hydrogen fluoride was discharged from the top of the distillation tower and 1400 g. of pyridine/hydrogen fluoride complex having an average formula of $Py.(HF)_3$ was recovered from the bottom. According to a fluorescent X-ray analysis, the product contained heavy metal components of 300 ppm of Fe, 30 ppm of Ni and 15 ppm of Cr. Thus, $Py.(HF)_3$ was fed through the line (4) at a rate of 3.5 mols/hour and through the line (23) at a rate of 3.5 mols/hour so as to use it as the starting material for the next reaction.

The unreacted sulfur, tetrafluoride, the R-113 solvent and the reproduced $Py.(HF)_3$ were recycled into the reactor to perform the reaction. As a result, the yield and purity of $SF_6$ as the object product were substantially the same.

We claim:

1. A process for producing $SF_6$ which comprises: (a) reacting a member of the group consisting of sulfur, sulfur chloride and sulfur tetrafluoride with chlorine and an amine/hydrogen fluoride complex to produce $SF_5Cl$; and (b) pyrolysing said $SF_5Cl$ to produce $SF_6$.

2. The process according to claim 1 wherein said sulfur chloride is sulfur monochloride or sulfur dichloride.

3. The process according to claim 1 or 2 wherein a molar ratio of hydrogen fluoride to amine of said amine/hydrogen fluoride complex is in a range of 1 to 6.

4. The process according to claim 1 or 2 wherein said amine is selected from the group consisting of pyridine, pyridine derivatives and tertiary amines.

5. The process according to claim 1 or 2, wherein a molar ratio of an amine component of said amine/hydrogen fluoride complex to sulfur or sulfur component of sulfur chloride (A/S; A: amine; S: sulfur) is in a range of 1 to 15.

6. The process according to claim 1 or 2, wherein a molar ratio of chlorine to sulfur or sulfur component of sulfur chloride (Cl/S; Cl: chlorine; S: sulfur) is in a range of 2 to 10.

7. The process according to claim 1 or 2, wherein said pyrolysis of $SF_5Cl$ into $SF_6$ is carried out at 200°–300° C. in the presence of copper or mercury as a catalyst.

* * * * *